United States Patent [19]

Ettel et al.

[11] 4,135,918

[45] Jan. 23, 1979

[54] ROAST-REDUCTIVE LEACH PROCESS FOR COPPER RECOVERY

[75] Inventors: Victor A. Ettel; Eric A. P. Devuyst; Ramamritham Sridhar; Charles E. O'Neill, all of Mississauga, Canada

[73] Assignee: The International Nickel Company, Inc., New York, N.Y.

[21] Appl. No.: 882,610

[22] Filed: Mar. 2, 1978

[30] Foreign Application Priority Data

May 13, 1977 [CA] Canada ............................ 278360

[51] Int. Cl.² .......................................... C22B 15/08
[52] U.S. Cl. ........................................ 75/117; 75/7;
 75/108; 75/115; 75/119; 423/36; 423/41;
 423/141
[58] Field of Search ................ 423/36, 41, 141;
 75/117, 108, 119, 115, 7

[56] References Cited

U.S. PATENT DOCUMENTS

| 790,238 | 5/1905 | Wilcox | 75/117 |
|---|---|---|---|
| 2,716,588 | 8/1955 | Hall | 423/36 |
| 2,796,342 | 6/1957 | Schaufelberger et al. | 75/108 |
| 2,817,583 | 12/1957 | Schlecht et al. | 75/7 |
| 3,573,896 | 4/1971 | Hori et al. | 75/117 |
| 3,684,489 | 8/1972 | Emicke et al. | 75/101 R |
| 3,744,994 | 7/1973 | Emicke et al. | 75/119 X |
| 3,839,013 | 10/1974 | Turkdogan et al. | 75/115 X |
| 4,067,952 | 1/1978 | Pittie et al. | 423/37 |

OTHER PUBLICATIONS

Shirts et al., Bureau of Mines Report of Investigations 7996, (1975).

*Primary Examiner*—G. Ozaki
*Attorney, Agent, or Firm*—Lewis Messulam; Ewan C. MacQueen

[57] ABSTRACT

A sulfide containing copper and one or more of iron, nickel and cobalt, is dead-roasted at a temperature of 750° C or above, then subjected to a pressure leach under reducing conditions to produce elemental copper and an aqueous solution of the other metals.

7 Claims, No Drawings

ROAST-REDUCTIVE LEACH PROCESS FOR COPPER RECOVERY

The present invention relates to the recovery of copper from sulfide-containing materials, and more particularly from materials which contain iron and nickel in addition to the copper.

Various hydrometallurgical processes have been suggested for the treatment of cupriferous materials to recover copper. Where the materials are sulfide concentrates which contain copper, iron, nickel and possibly cobalt and precious metals it has been suggested to leach the concentrate under pressure in ammoniacal or in acid solutions. However such leaches are not found to be sufficiently selective between the copper, iron and nickel. It has also been suggested to subject such sulfidic materials to a roasting treatment, so that copper and other sulfides are oxidized to their respective sulfate and oxides, and thereafter leaching the roasted material. Such techniques also exhibit poor selectivity with respect to copper, so that separate electrolysis has to be relied on to separate the copper from other metals dissolved in the lixiviant. Moreover another difficulty encountered when leaching roasted sulfide concentrates lies in the poor metal recoveries which can be accounted for by the known tendency for ferrites to form during a roast. Copper tied up in ferrites has proved particularly difficult to solubilize during a subsequent leach.

It is an object of the present invention to provide an improved process for efficiently recovering copper from such sulfidic copper-iron-nickel-containing materials.

According to the invention copper is recovered from a particulate sulfide-containing material which contains in addition to copper at least one other metal from the group: iron, nickel and cobalt, by roasting the material at a temperature of at least about 750° C. for a period of sufficient duration to provide a substantially sulfur-free calcine, forming a slurry of the calcine with water or an aqueous solution containing at least a sufficient amount of sulfuric acid to supplement any sulfuric acid formed in situ and satisfy the stoichiometry of formation of sulfates of the other metal(s), heating the slurry to at least 110° C. under pressure and in the presence of a reducing gas to sulfate the other metal(s) and reduce the copper to elemental form, and separating the product of the pressure-heat treatment into a liquor containing the other metal(s) and a solids residue containing the elemental copper.

The process of the invention is applicable to a wide range of copper-containing materials, but it is particularly useful for the treatment of materials wherein the amounts of metals other than copper are relatively low. For example it is particularly suitable for materials wherein the copper content exceeds, and preferably is much greater than, the sum of the contents of the other metals. This will not usually be the case for ores or concentrates, but might be true of mattes as well as various metallurgical residues obtained for example from an acid leaching process or a nickel carbonylation process. Thus the practical implementation of the process of the invention might consist either in the direct treatment of suitable mattes, or given a starting material too high in nickel, cobalt and iron, the material could be subjected to leaching or carbonylation and the residue treated in accordance with the invention. Matte to be treated by the described process could advantageously be prepared by oxygen flash smelting. The high strength $SO_2$ steam produced by the flash furnace is then conveniently used for the reductive leaching. The smelting operation could also reject part of the iron content of the concentrate so that less ferrous sulfate is produced in the reductive leaching operation.

The dead-roasting must be carried out at a temperature no lower than about 750° C. in order to ensure that the copper is present as oxide rather than as sulfate in the calcine. While it is possible to resort to higher temperatures for the sake of rapidity of the roast, temperatures higher than about 950° C. are neither necessary nor indeed desirable. We prefer to roast the feed material at a temperature in the range 750°–800° C. The roasting period is of course dependent on the initial sulfur content of the material and typically a period of the order of 3–6 hours is used. Advantageously the roasting is carried out in a fluid bed roaster apparatus whereby off-gases are obtained which are concentrated with respect to sulfur dioxide.

When the process is carried out some ferrites are inevitably formed during the 'dead-roasting' which is intended to drive off all the sulfur from the material and leave the copper and other metals essentially in the form of oxides. However we have found that the reductive leach process used after the roasting enables even the ferrites to be leached readily so that a high proportion of the iron, nickel and cobalt are solubilized while a high proportion of the copper reports in elemental form in the solids residue.

The calcine is slurried with an aqueous sulfuric acid solution and treated in an autoclave. For this purpose a slurry consistency of up to 40% solids can be used. The amount of sulfuric acid in the solution must be sufficient to ensure that when taken in combination with any sulfuric acid generated in situ it will balance the stoichiometric requirement for the formation of sulfates of all the nickel, cobalt and iron in the calcine. The amount of acid used will therefore clearly depend on the composition of the calcine; furthermore it will depend on the reducing agent used since the latter may or may not result in generation of sulfuric acid as explained below.

The pressure leach must be carried out in the presence of a reducing gas, and two gases we have found particularly effective for this task are hydrogen and sulfur dioxide. The leach should be carried out for a period of the order of ½ to 2 hours at a temperature of at least 110° C., preferably 130°–180° C. and most preferably, 150°–160° C., under a total pressure in the autoclave of the order of 0.75–3 megapascals (MPa). Where hydrogen is used as the reducing gas it should be present, at the leaching temperature, at a partial pressure of not less than about 1 MPa, while where sulfur dioxide is used the partial pressure thereof at the leaching temperature should be at least about 0.5 MPa. It is possible to achieve this by feeding the approximate amount of hydrogen or sulfur dioxide into the autoclave. However in the case of sulfur dioxide, we prefer to rely on the high solubility thereof in water at lower temperatures, and adopt the procedure of introducing sulfur dioxide into the slurry at a temperature below 80° C., e.g., at room temperature, to dissolve the necessary amount and thereafter heat the slurry in a closed autoclave. By forming a saturated solution at room temperature, at which temperature the partial pressure of sulfur dioxide is about 0.2 MPa, and heating this to 150° C. a total pressure of 2 MPa is achieved with a sulfur dioxide partial pressure of about 1.5 MPa.

When hydrogen is used as the reducing gas, the reactions occurring during leaching are believed to be as follows:

$$CuO + H_2 \rightarrow Cu^* + H_2O$$

$$NiO + H_2SO_4 \rightarrow NiSO_4 + H_2O$$

$$Fe_2O_3 + 2H_2SO_4 + H_2 \rightarrow 2FeSO_4 + 3H_2O$$

$$Fe_3O_4 + 3H_2SO_4 + H_2 \rightarrow 3FeSO_4 + 4H_2O$$

$$Co_2O_3 + 2H_2SO_4 + H_2 \rightarrow 2CoSO_4 + 3H_2O$$

$$Co_3O_4 + 3H_2SO_4 + H_2 \rightarrow 3CoSO_4 + 4H_2O$$

$$Fe_2NiO_4 + 3H_2SO_4 + H_2 \rightarrow 2FeSO_4 + NiSO_4 + 4H_2O$$

However when sulfur dioxide is used, the following reactions are believed to take place:

$$CuO + SO_2 + H_2O \rightarrow Cu^* + H_2SO_4$$

$$NiO + H_2SO_4 \rightarrow NiSO_4 + H_2O$$

$$Fe_2O_3 + H_2SO_4 + SO_2 \rightarrow 2FeSO_4 + H_2O$$

$$Fe_3O_4 + 2H_2SO_4 + SO_2 \rightarrow 3FeSO_4 + 2H_2O$$

$$Co_2O_3 + H_2SO_4 + SO_2 \rightarrow 2CoSO_4 + H_2O$$

$$Co_3O_4 + 2H_2SO_4 + SO_2 \rightarrow 3CoSO_4 + 2H_2O$$

$$Fe_2NiO_4 + 2H_2SO_4 + SO_2 \rightarrow 2FeSO_4 + NiSO_4 + 2H_2O$$

It will be clear from the above equations that when sulfur dioxide is used as reductant, the dissolution of iron, nickel and cobalt consumes sulfuric acid, whereas the reduction of copper generates the acid. Thus if the amount of copper is sufficiently high in relation to the iron, nickel and cobalt contents, little or no acid may be needed to balance the stoichiometry. In fact it is a particular advantage of the process that, with a calcine of suitable copper/other metal ratio, the sulfuric acid solution used for the leach can be spent electrolyte from an electrowinning operation. It will also be apparent that if the copper/other metal ratio is too high the result can be a high acid concentration at the end of the leach. This is undesirable because of the tendency for copper to be solubilized if the concentration of acid is too high. Generally the proportions should be controlled so that the final acid concentration is not greater than 50 grams per liter.

Thus if excessive acid formation is expected in view of calcine composition, the problem can be overcome by relying on hydrogen rather than sulfur dioxide for the reductive leach. Alternatively, it may be preferable to reduce the copper content of the material to be reductively leached. A particularly useful way of accomplishing this purpose involves resorting to the preferential copper leaching method described in co-pending U.S. patent application Ser. No. 894,900 filed Apr. 10, 1978, assigned in common with the present invention. The technique in question involves dead-roasting of a sulfide material at 750° C. or above followed by a sulfuric acid leach, at 50° C. or above such that copper is solubilized preferentially to nickel, iron and cobalt in the material. Thus, inasmuch as both this preferential leach technique and the copper recovery method of the present invention require an initial high temperature dead-roasting treatment, they can be combined conveniently in a process wherein the sulfide material which is high in copper is first dead-roasted, then leached in sulfuric acid to dissolve some of the copper preferentially, and the residue of this leach is separated from the copper-bearing solution, reslurried with water or an aqueous sulfuric acid solution and pressure-leached in the presence of a reducing gas.

An important application of the process of the invention lies in the treatment of materials which contain, in addition to the copper, iron, etc., a significant amount of precious metals. When such materials are subjected to roasting followed by reductive leaching, the precious metals are separated from the iron, nickel and cobalt, and report together with elemental copper in the solids residue of the leach. As a result it is possible to recover iron and nickel from the liquor in a conventional fashion, while the copper and precious metals can be conveniently separated from one another by a pyrometallurgical route or a leach/electrowinning route in well known fashion.

The invention will now be particularly described by way of examples, with reference to preferred embodiments thereof. All percentages referred to herein, unless otherwise specified, are percentages by weight.

EXAMPLE 1

A copper-containing flash furnace matte was used which contained:

| | | |
|---|---|---|
| copper | : | 43.0% |
| nickel | : | 11.6% |
| iron | : | 21.0% |
| cobalt | : | 0.08% |
| sulfur | : | 22.5% |

A sample of this matte was roasted at 800° C. for a period of 6 hours. The resulting calcine was slurried with a 130 grams per liter (g/l) sulfuric acid solution in the ratio of 150 grams of calcine to 1 liter of solution. The slurry was then heated in an autoclave to 130° C. Hydrogen was fed into the autoclave such that the total pressure therein was about 2.6 MPa while the hydrogen partial pressure was 2.2 MPa. Leaching was carried out for one hour, during which the slurry temperature rose from 130° to 180° C. At the end of that time, the leach liquor was separated from the solid residue and each was analyzed to obtain the results shown in Tables 1 to 3 below.

TABLE 1

| Phase | Weight (g) | Composition (%) | | | |
|---|---|---|---|---|---|
| | | Copper | Nickel | Iron | Cobalt |
| Calcine | 150. | 41.6 | 11.2 | 20.3 | 0.08 |
| Leach Residue | 64.8 | 88 | 0.86 | 1.30 | 0 |

TABLE 2

| Phase | Composition (g/l) | | | | |
|---|---|---|---|---|---|
| | Copper | Nickel | Iron | Cobalt | $H_2SO_4$ |
| Initial Solution | — | — | — | — | 130 |
| Final Liquor | 1.54 | 15.7 | 31.1 | 0.096 | 48 |

TABLE 3

| Phase | Metal Distribution (%) | | | |
|---|---|---|---|---|
| | Copper | Nickel | Iron | Cobalt* |
| Final Liquor | 2.5 | 96.6 | 97.1 | 80 |
| Leach Residue | 97.5 | 3.4 | 2.9 | 20 |

*The low cobalt levels could not be accurately determined

It will be seen from the above results that the roast-reductive leach process resulted in recovery of a very high proportion of the available copper in the form of an 88% pure product.

EXAMPLE 2

A further 150 gram sample of the calcine produced as described in Example 1 by roasting of flash furnace matte was slurried with 1 liter of water. Sulfur dioxide at a pressure of 0.2 MPa was then introduced into the slurry at room temperature to the point of saturation. The saturated slurry was thereafter heated in an autoclave for one hour at 150° to 165° C. under a total pressure of about 2 MPa and a sulfur dioxide partial pressure of about 1.5 MPa. The slurry was then cooled and the liquor separated from the leach residue. The liquor was analyzed and found to contain:

| | | | |
|---|---|---|---|
| copper | : | 1.1 | g/l |
| nickel | : | 14.5 | g/l |
| iron | : | 32.0 | g/l |
| cobalt | : | 0.074 | g/l |
| sulfuric acid | : | 43.5 | g/l. |

Thus it will be seen that the reduction of copper oxide by sulfur dioxide produced more than enough sulfuric acid to satisfy the stoichiometry of sulfation of the other metals. The leach residue, weighing 62 grams, was found to contain:

| | | |
|---|---|---|
| copper | : | 91.8% |
| nickel | : | 0.62% |
| iron | : | 1.02% |
| cobalt | : | <0.02% | so that the distribution of the metals in the final slurry was as shown in Table 4 below:

TABLE 4

| Phase | Metal Distribution (%) | | | |
|---|---|---|---|---|
| | Copper | Nickel | Iron | Cobalt* |
| Final Liquor | 1.7 | 97.1 | 98.0 | 92 |
| Leach Residue | 98.3 | 2.9 | 2.0 | 8 |

*Not accurately determined.

EXAMPLE 3

A test was carried out on a copper concentrate which analyzed:

| | | |
|---|---|---|
| copper | : | 30.0% |
| nickel | : | 2.0% |
| iron | : | 31.5% |
| cobalt | : | 0.08% |
| sulfur | : | 30.0% |

The concentrate was roasted at 800° C. for 6 hours, and 100 grams of the resulting calcine were slurried with one liter of water. The slurry was saturated at room temperature with sulfur dioxide, and heated in an autoclave in the manner described in Example 2. The results are shown in Tables 5 and 6 below:

TABLE 5

| Phase | Units | ASSAYS | | | | |
|---|---|---|---|---|---|---|
| | | Copper | Nickel | Iron | Cobalt | $H_2SO_4$ |
| Calcine | % | 31.5 | 2.15 | 33.1 | 0.08 | — |
| Leach Residue | % | 70.5 | 0.02 | 0.47 | <0.02 | — |
| Final Liquor | g/l | 0.42 | 2.09 | 33.0 | 0.083 | 19 |

TABLE 6

| Phase | Metal Distribution (%) | | | |
|---|---|---|---|---|
| | Copper | Nickel | Iron | Cobalt* |
| Final Liquor | 1.3 | 99.6 | 99.4 | 90 |
| Leach Residue | 98.7 | 0.4 | 0.6 | 10 |

*Not accurately determined.

EXAMPLE 4

The feed material for this test was a residue from a carbonylation process, which residue contained:

| | | |
|---|---|---|
| copper | : | 55.1% |
| nickel | : | 7.4% |
| iron | : | 8.0% |
| cobalt | : | 3.7% |
| sulfur | : | 17.4% |

The feed was roasted at 900° C. for 3 hours to provide a calcine, 100 grams of which were slurried with 1 liter of water. The slurry was saturated with sulfur dioxide at 25° C. (partial pressure 0.2 MPa) then heated under pressure (total pressure: 2 MPa, partial pressure of sulfur dioxide about 1.5 MPa) for one hour at between 150° and 160° C. Analysis of the final liquor separated from the solids residue (which weighed 56 grams) showed that the copper reduction had produced a more than adequate supply of acid. The tests results are shown in Tables 7 and 8 below:

TABLE 7

| Phase | Units | ASSAYS | | | | |
|---|---|---|---|---|---|---|
| | | Copper | Nickel | Iron | Cobalt | $H_2SO_4$ |
| Calcine | % | 57.3 | 7.61 | 8.33 | 3.75 | — |
| Leach Residue | % | 90.9 | 0.03 | 0.25 | 0.04 | — |
| Final Liquor | g/l | 3.34 | 7.65 | 8.41 | 3.71 | 57 |

TABLE 8

| Phase | Metal Distribution (%) | | | |
|---|---|---|---|---|
| | Copper | Nickel | Iron | Cobalt |
| Final Liquor | 5.8 | 99.8 | 98.3 | 99.4 |
| Leach Residue | 94.2 | 0.2 | 1.7 | 0.6 |

Example 4 is a good illustration of the excellent separation which can be achieved by the roast-reductive leach process of the invention between copper on one hand and iron, nickel and cobalt on the other. As already stated precious metals contained in the calcine would report in the copper product. Of the metals which might be present in addition to those already referred to, selenium would be concentrated in the metallic copper residue, while zinc and arsenic would be solubilized in the same way as iron.

Thus while the invention has been described with reference to preferred embodiments thereof, various modifications may be made to such embodiments without departing from the scope of the invention which is defined by the appended claims.

We claim:

1. A process for recovering copper from a particulate sulfide-containing material which contains in addition to said copper at least one other metal selected from the group consisting of iron, nickel and cobalt, comprising roasting said material at a temperature of at least about 750° C. for a period of sufficient duration to provide a substantially sulfur-free calcine, forming a slurry of said calcine with water or an aqueous solution containing at least a sufficient amount of sulfuric acid to supplement any sulfuric acid formed in situ and satisfy the stoichiometry of formation of sulfates of said other metal(s), heating said slurry to a temperature of at least about 110° C. under superatmospheric pressure in the presence of a reducing gas to sulfate said other metal(s) and reduce said copper to elemental form, and separating the product of said pressure-heat treatment into a liquor containing said other metal(s) and a solids residue containing said elemental copper.

2. A process as claimed in claim 1 wherein said reducing gas is sulfur dioxide and is present at a partial pressure of at least about 0.5 Megapascal.

3. A process as claimed in claim 2 wherein the required partial pressure of sulfur dioxide is achieved by saturating said calcine slurry with sulfur dioxide at a temperature below 80° C., prior to subjecting it to said heating in a pressure vessel.

4. A process as claimed in claim 1 wherein said reducing gas is hydrogen and is present at a partial pressure of at least about 1 Megapascal.

5. A process as claimed in claim 1 wherein said roasting is carried out at a temperature of about 750° to 800° C.

6. A process as claimed in claim 1 wherein said heating of the slurry is carried out at the temperature of about 150° to 165° C.

7. A process as claimed in claim 1 wherein said particulate material contains copper, nickel, iron and precious metals, and said amount of sulfuric acid used is sufficient to satisfy the stoichiometry of sulfating all of said nickel and iron, whereby said liquor recovered after said pressure-heat treatment contains substantially all of said nickel and iron, and said solids residue contains substantially all of said copper and precious metals.

* * * * *